(12) United States Patent
Hagspiel et al.

(10) Patent No.: US 7,650,535 B2
(45) Date of Patent: Jan. 19, 2010

(54) ARRAY DELETE MECHANISMS FOR SHIPPING A MICROPROCESSOR WITH DEFECTIVE ARRAYS

(75) Inventors: Norbert Hagspiel, Wendlingen (DE); William V. Huott, Holmes, NY (US); Frank Lehnert, Weil im Schoenbuch (DE); Brian R. Prasky, Wappingers Falls, NY (US); Richard Rizzolo, Red Hook, NY (US); Rolf Sautter, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 11/522,142

(22) Filed: Sep. 16, 2006

(65) Prior Publication Data

US 2008/0126900 A1 May 29, 2008

(51) Int. Cl.
*G06F 11/00* (2006.01)
(52) U.S. Cl. .......................................... 714/8
(58) Field of Classification Search ....................... 714/8
See application file for complete search history.

(56) References Cited

U.S. PATENT DOCUMENTS

| 7,257,745 | B2* | 8/2007 | Huott et al. ................. 714/710 |
| 7,487,397 | B2* | 2/2009 | Lockwood et al. ............ 714/30 |
| 2007/0101194 | A1* | 5/2007 | Lockwood et al. ............ 714/30 |

* cited by examiner

*Primary Examiner*—Robert Beausoliel
*Assistant Examiner*—Amine Riad
(74) *Attorney, Agent, or Firm*—Lynn L. Augspurger; John E. Campbell

(57) ABSTRACT

Detecting and correcting errors in arrays after ABIST testing, after ABIST testing, detected errors are faults are isolated by blowing a fuse.

20 Claims, 4 Drawing Sheets

ARRAY DELETE MECHANISMS FOR SHIPPING A MICROPROCESSOR WITH DEFECTIVE ARRAYS

BACKGROUND

1. Field of the Invention

The invention relates to detecting and correcting errors in arrays after successful ABIST testing, where diagnostic testing is performed upon the array after ABIST testing, and the detected error or fault is isolated.

2. Background Art

The problem of past s390-processors was, that whenever a PU (processor unit) has an array with errors found by abist-tests, there was no possibility to disable part or all of this array. In this cases the PU couldn't be used at all since the abist-tests didn't pass IML.

Especially the sensitive PCAMs used in Bluefire did often fail and decrease the yield heavily, and therefore we looked for a solution to get also PUs with defect array sets running.

Because the yield-problem will most likely get bigger with new technologies and having more cores on a chip, it might be useful to have also partial good chips with failing arrays for spare PUs or at least for chip and system bring-up.

Actually array fails occurring during normal operation mode (after abist-tests did run successfully) leads in deletion of the failing array set. This ensures, that the PU can be used also after an upcoming fail, but with less array sets (results in slightly decreased performance, but w/o showing functional problems). The problem is, that PUs with defective arrays found on the tester cannot be used in a system.

Because of the given performance delta it also implies that such a processor can not be shipped the same as a processor without any array sets disabled for the performance delta between the two is readily measurable.

SUMMARY OF THE INVENTION

The DANU-Processor has a TLB2 which is a 4 set, associative, hierarchical lookaside buffer (2 levels of hierarchy). Each of the sets has a RAM part (random access memory) and a CAM part (content access memory). Especially the CAM-part is very sensitive to fails with the new technology, and therefore a solution was necessary which enables a processor to disable one or more defect sets of the TLB2. This makes it possible (especially during the bring-up process) to use also the processors with defective TLB2 arrays which increases the yield during bring-up dramatically. Since now processors with one or more failing TLB2 array sets must be configured out and cannot be used.

The functional logic could delete sets already in the Freeway-system, but this works only for fails occurring after the IML sequence, because during IML the ABIST do check the arrays, and fails being present already at that point didn't pass the ABIST-test (MISR signature fails) and therefore this processor having a defect TLB2-set couldn't be used, even though the processor would work properly with one or even all TLB2-sets being defect.

The solution is to use e-fuses (one fuse for each of the sets) and to have separate misr latch busses for each set of the array. This new array misr latch structure enable the abist engine to handle the disabled sets from the array. The abist engine can analyze each set unique from each other.

If a set is failing in the fab, the fuse for this set will be blown and the chip can used.

PU's having defective array sets can be used in the system, either for bring-up or shipping. The yield is dramatically increased with the new array delete mechanisms.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The steps of the method are as follows:

The first step is checking for failing array sets during fabrication, that is ABIST testing. As part of or after testing, appropriate fuses are blown to deactivate failing array set. For example, during bring-up only performance degradation will be noticed but no functional degradation and no ABIST-fail will occur.

As to ABIST-fails found during bring-up:
a) Analyze reported ABIST-fail;
b) Blow appropriate e-fuse to deactivate failing array set;
c) Rerun ABIST with standard setup,
d) The fail will not occur, because the MISR signature will be good due to the masking by the described built-in hardware, i.e., blowing the fuse.

In system run:
a) The system starts and runs the ABIST tests
b) The activated fuses will force "good" MISR-signatures in order to pass the ABIST test during IML
c) SE reads out the fuse values and sets the delete-latches (via scan-chain) for each fused array set. This is necessary to tell the translator logic not to use the defective array set.
d) The system runs with less performance, but functionally correct For future designs this logic delete latches can be set directly by the fuses instead of doing this SE controlled.

Figure 1:
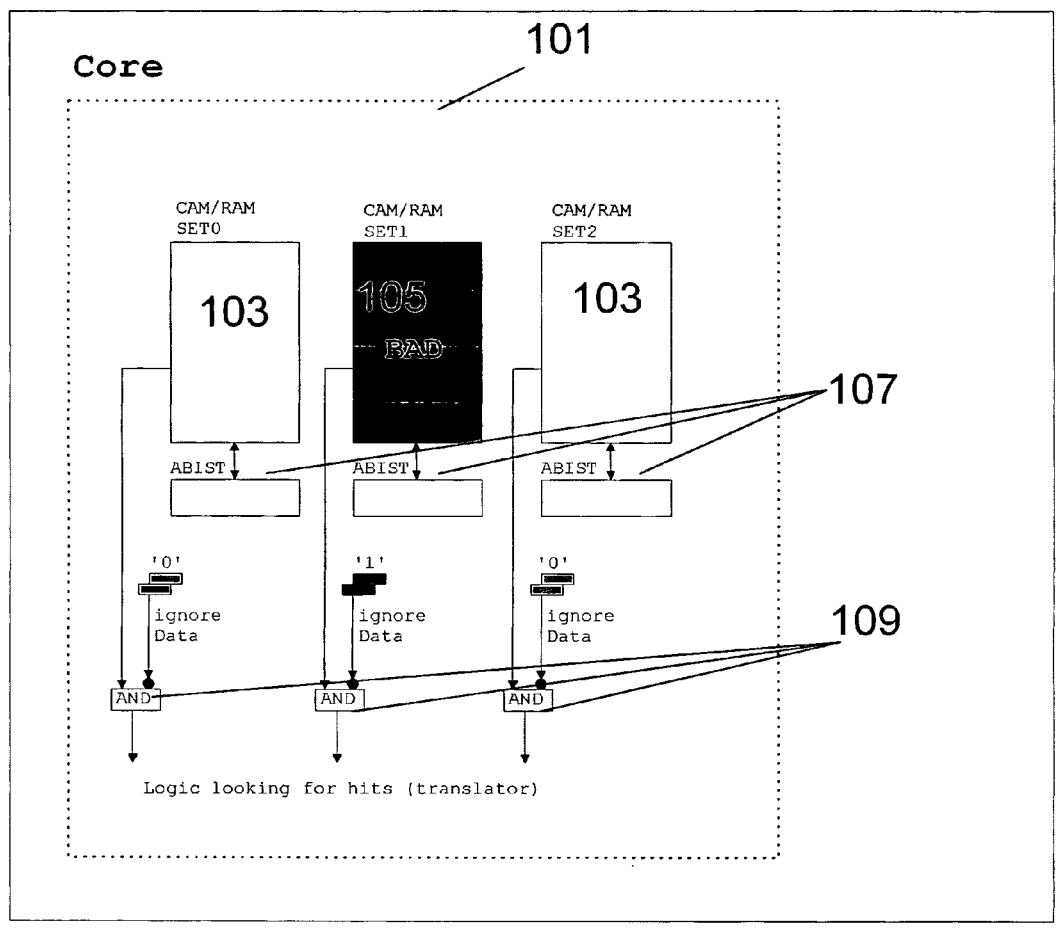
FIG. 1 is a simplified schematic diagram showing a processor unit with three arrays, e.g., translation look aside buffers, one of which is shown as defective. The processor includes associated ABIST test units. The output is "anded."

This is illustrated in the Figures, Starting with FIG. 1, FIG. 1 is a simplified schematic diagram showing a processor unit 101 with three arrays, e.g., translation look aside buffers 103, one of which is shown as defective 105. The processor includes associated ABIST test units 107. The output is "anded" 109.

Figure 2:
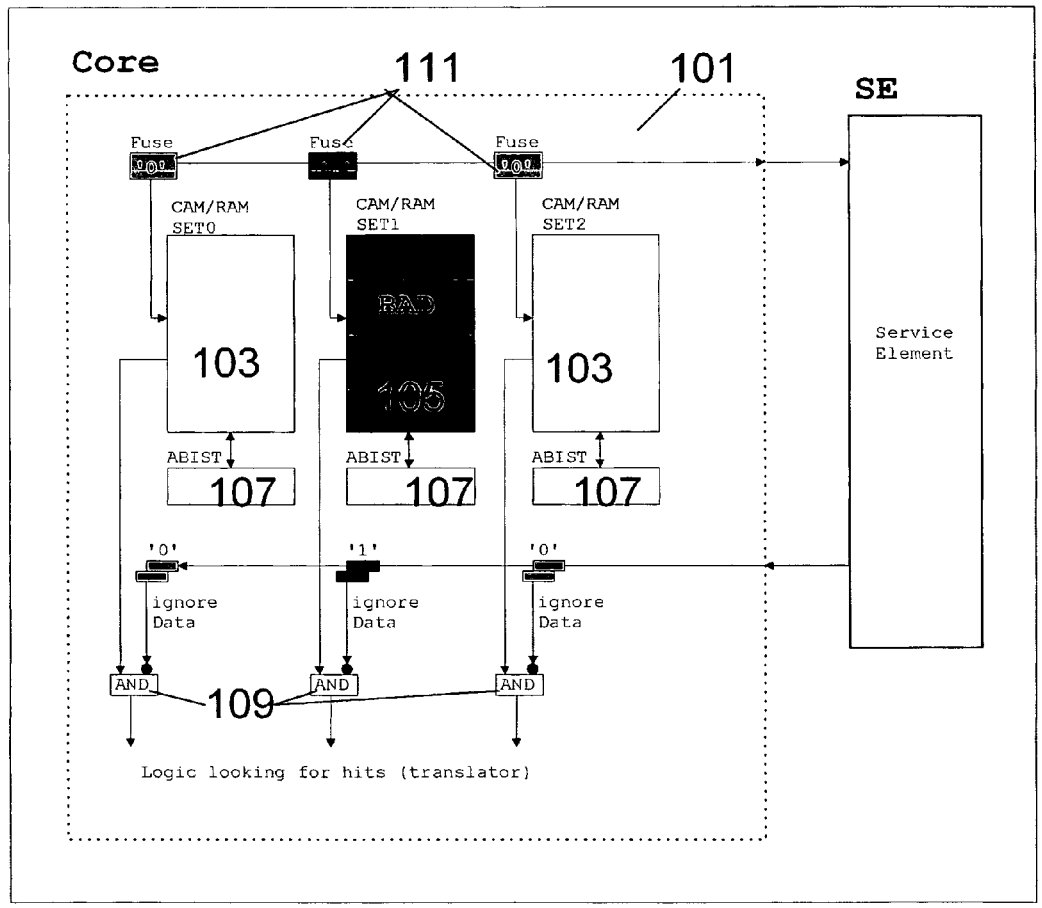
FIG. 2 is a simplified schematic diagram showing a processor unit with three arrays, e.g., translation look aside buffers, one of which is shown as defective. The processor includes associated ABIST test units, and fused inputs to take defective arrays out of service. The output is "anded."

FIG. 2 is tracks FIG. 1, but in addition it shows how the e-fuse values are read-out by the SE (Service Element) in order to set the "ignore Data latches" with the appropriate values.

Figure 3:
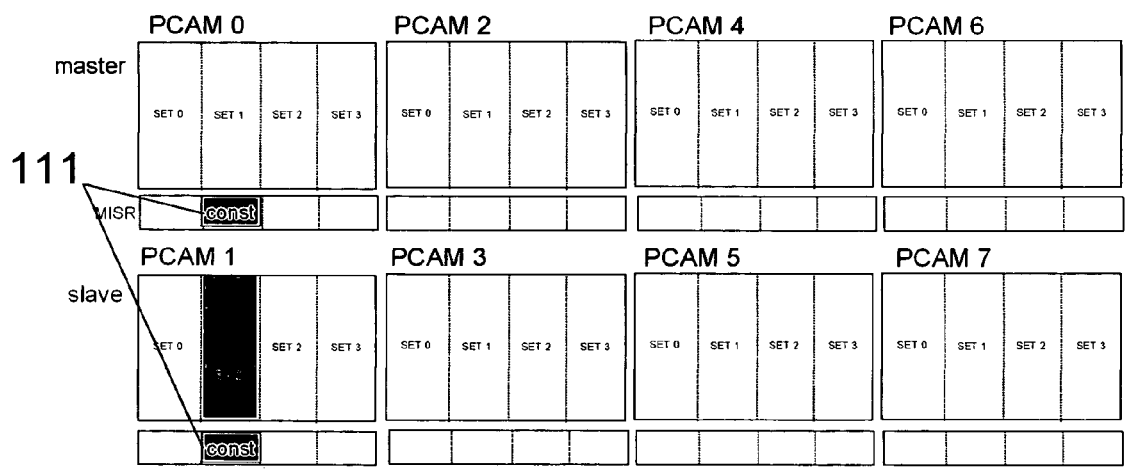
FIG. 3 illustrates several associated arrays with an E-fuse isolating a defective array. An E-fuse indicates a bad PCAM set that will disable the clocking and force a constant value to the MISR latches for the master and slave PCAMS.

FIG. 3 illustrates several associated arrays with an E-fuse isolating a defective array. An E-fuse 111 indicates a bad PCAM set that will disable the clocking and force a constant value to the MISR latches for the master and slave PCAMS. It is to be noted that read data from a deselected set or quad must not get into the MISR or array data out latches for both master and slave PCAMs.

Figure 4:
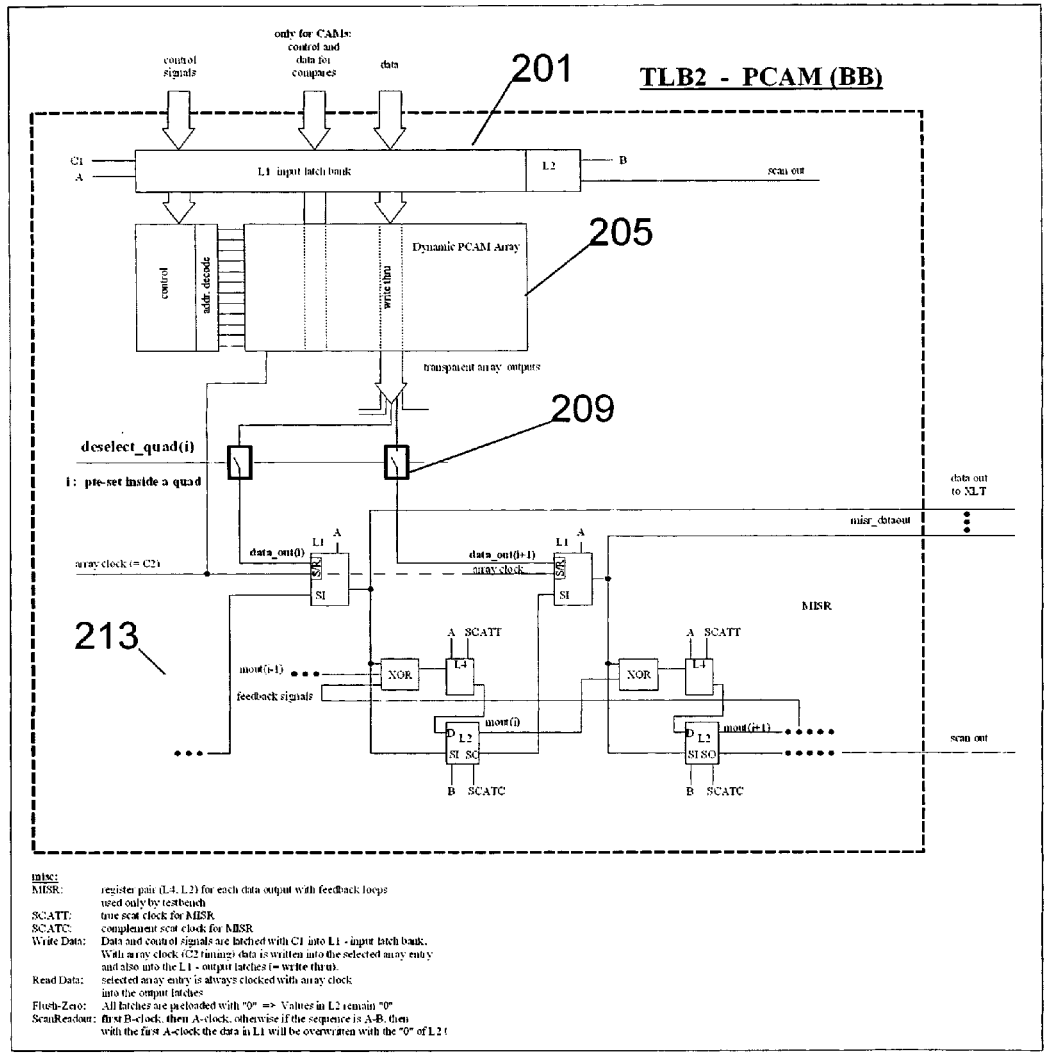
FIG. 4 illustrates an overall processor with an input latch bank, dynamic PCAM array, deselect quad control line, and array and data logic.

FIG. 4 illustrates the implementation of the deselection inside a PCAM-set. 201 is the input latch bank of a PCAM, 205 the dynamic PCAM array, 209 the deselect quad control line switch and 213 the MISR logic.

BHT

The branch prediction takes the deletion logic a step further where as the performance impact is around $\frac{1}{1000}^{th}$ of 1% of PU performance. The branch prediction logic consist of a BTB, branch target buffer, which has 8 k entries. The array is 4-way set associative and is 2 k deep. Each entry in this table is 64 bits. This places the array at over ½ million array bits which were priority required to be perfectly designed in the manufacturing process.

As per the TLB2, the BTB contains a mechanism at run time to detect an array failure, which could have developed over time, and to delete the appropriate set such that the processor unit could continue running without encountering further failure encounters from the given set of the BTB array. Such a deletion process required entries to 1) no longer be written to this set of the array and 2) ignore any future errors detected from this set of the given array as data from this set is no longer in use.

When the ABIST engine checks for the validity of an array, it is checking cell by cell for functional compliance. It is therefore possible to not only detect which set of the given array is bad, but also which precise entry of the array is bad for the exact bad cell is known. Fuses are not only contained for the given set but also the given index for the entry of the bad cell. For a given bad array cell, this now allows disable actions to take place on $\frac{1}{8192}^{nd}$ of the array entries over $\frac{1}{4}^{th}$ of the array entries.

When a write is to take place to the index value which contains a bad cell in one of the sets, logic which determines the set to write a given entry into makes it appear that the set with the bad cell is disabled. This prevents the given set with the bad cell from being written to. Upon moving array from the index with a bad entry, in respect to a write, the given set no longer looks as though it is deleted.

The invention may be implemented, for example, by having the system for testing the array and enabling the abist engine to handle disabled sets from the array. The abist engine can analyze each set unique from each other so that if a set is failing under test, the fuse for this set will be blown, and the processing unit used PU's having defective array sets can be used in the system, and executing the method as a software application, in a dedicated processor or set of processors, or in a dedicated processor or dedicated processors with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for isolating defective cells in a processing unit.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory or magneto-optical storage. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method to test processor units for defective translation look aside buffer arrays, configure out defective arrays, and thereafter use processor units with configured out, defective arrays, comprising:

after a processor has failed a previous ABIST (Array Built-In Self Test) for a defect in a hierarchical lookaside buffer array TLB2 array set, enabling said processor, which has an array set of hierarchical translation lookaside buffer arrays (TLBS) which includes said TLB2 array set having a four way, set associative, hierarchical lookside buffer and separate multiple input signature register (MISR) latch busses for each set using e-fuses, to be used after reconfiguration by:
 a) individually analyzing each translation look aside buffer array having failed in the fabrication with said ABIST engine for defects;
 b) blowing a fuse associated with a translation look aside buffer array having a defect to configure out the associated TLB2 array set; and
 c) using said processor unit having a hierarchical lookaside buffer array having a defect which has an associated TLB2 array set which has been configured out even if the processor unit failed in fabrication testing.

2. The method of claim 1 wherein said processor units have array latches to enable the ABIST engine to handle failed array sets from the array and processor units having defective arrays to be used.

3. The method of claim 1 wherein said ABIST engine analyzes each set of four sets of a hierarchical lookaside buffer by:
 a) scanning failing array sets;
 b) activating fuses of failing array sets found in a previous fabrication test; and
 c) in subsequent system runs:
  i) initiating ABIST tests;
  ii) blowing fuses forcing good latch signatures to pass ABIST tests; and
  iii) reading fuse values and setting latches for each fused array to thereby isolate defective arrays.

4. The method according to claim 3 wherein for system runs:
   a) the system starts and runs the ABIST tests; and,
   b) the activated fuses force "good" MISR-signatures in order to pass the ABIST test during TML (Initial Microcode Load); and,
   c) the processor service element (SE) reads out the fuse values and sets the delete-latches via a scan-chain for each fused array set to tell the translator logic not to use the defective array set.

5. The method according to claim 4 wherein for system runs the system:
   enables a branch target buffer (BTB) which contains a mechanism which at run time is enabled to detect an array failure, which could have developed over time; and
   deletes an array set such that the processor unit can continue running without encountering further failure encounters from the given set of the BTB array, and
   checks cell by cell, when the ABIST engine checks for the validity of an array set, for functional compliance to not only detect which set of the given array is bad, but also which precise entry of the array is bad for the exact bad cell is known as fuses are not only contained for the given set but also the given index for the entry of the bad cell allowing a disable action to take place.

6. A computer system having a plurality of processor units with an Array Built-In Self Test (ABIST) engine which includes instructions stored on tangible computer storage medium for testing arrays, said processor units associated with fuses to enable isolation, where said ABIST engine tests the arrays, and the arrays are blown to isolate defective arrays, and said processor is configured to operate with defective arrays isolated by enabling a processor, having a set of hierarchical translation lookaside buffer arrays (TLBS) which includes a TLB2 array set having a four way, set associative, hierarchical lookside buffer and separate multiple input signature register (MISR) latch busses for each set using e-fuses, by reconfiguration of said processor after the processor failed a previous ABIST (Array Built-In Self Test) because of a defect in said TLB2 array set.

7. The computer system of claim 6 adapted to carry out a method to test the processor units for defective translation look aside buffer array sets by
   a). individually analyzing each translation look aside buffer array set which failed in a fabrication test with an ABIST engine for defects;
   b). blowing a fuse associated with a translation look aside buffer array set having a defect to configure out the array set; and
   c). using a processor unit having with a hierarchical lookaside buffer array having a defect which has an associated TLB2 array set which has been configured out even if the processor unit failed in fabrication testing.

8. The computer system of claim 7 wherein said processor units have array latches to enable the ABIST engine to handle failed array sets from the array and processor units having defective arrays to be used.

9. The computer system of claim 7 wherein said ABIST engine analyzes each set of four sets of a hierarchical lookaside buffer by:
   a) scanning failing array sets;
   b) activating fuses of failing array sets found in a previous fabrication test; and
   c) in subsequent system runs:
      i) initiating ABIST tests;
      ii) blowing fuses forcing good latch signatures to pass ABIST tests; and
      iii) reading fuse values and setting latches for each fused array to thereby isolate defective arrays.

10. The computer system according to claim 9 wherein for system runs:
   a) the system starts and runs the ABIST tests; and,
   b) the activated fuses force "good" MISR-signatures in order to pass the ABIST test during IML(Initial Microcode Load); and,
   c) the processor service element (SE) reads out the fuse values and sets the delete-latches via a scan-chain for each fused array set to tell the translator logic not to use the defective array set.

11. The computer system according to claim 10 wherein for system runs the system at runtime:
   enables a branch target buffer (BTB) which contains a mechanism to detect an array failure, which could have developed over time, and
   deletes an array set such that the processor unit can continue running without encountering further failure encounters from the given set of the BTB array, and
   checks cell by cell, when the ABIST engine checks for the validity of an array, for functional compliance to not only detect which set of the given array is bad, but also which precise entry of the array is bad for the exact bad cell is known as fuses are not only contained for the given set but also the given index for the entry of the bad cell allowing a disable action to take place.

12. A computer program product comprising a computer readable tangible medium having computer readable computer code thereon to control and configure a computer to carry out a method to test processor units for defective translation look aside buffer arrays, configure out defective arrays, and thereafter use processor units with configured out, defective arrays, comprising:
   after a processor has failed a previous ABIST (Array Built-In Self Test) for a defect in a hierarchical lookaside buffer array TLB2 array set, enabling said processor, said processor, which has an array set of hierarchical translation lookaside buffer arrays (TLBS) which includes said TLB2 array set having a four way, set associative, hierarchical lookside buffer and separate multiple input signature register (MISR) latch busses for each set using e-fuses, to be used after reconfiguration by:
   a) individually analyzing each translation look aside buffer array having failed in the fabrication with said ABIST engine for defects;
   b) blowing a fuse associated with a translation look aside buffer array having a defect to configure out the associated TLB2 array set; and
   c) using a processor unit having a hierarchical lookaside buffer array having a defect which has an associated TLB2 array set which has been configured out even if the processor unit failed in fabrication testing.

13. The program product of claim 12 wherein said processor units have array latches to enable the ABIST engine to handle failed array sets from the array and processor units having defective arrays to be used.

14. The program product of claim 12 wherein said ABIST engine analyzes each set of four sets of a hierarchical lookaside buffer by:
  a) scanning failing array sets;
  b) activating fuses of failing array sets found in a previous fabrication test; and
  c) in subsequent system runs:
    i) initiating ABIST tests;
    ii) blowing fuses forcing good latch signatures to pass ABIST tests; and
    iii) reading fuse values and setting latches for each fused array to thereby isolate defective arrays.

15. The program product according to claim 14 wherein for system runs a mode is provided whereby:
  a) the system starts and runs the ABIST tests; and,
  b) the activated fuses force "good" MISR-signatures in order to pass the ABIST test during IML (Initial Microcode Load); and,
  c) the processor service element (SE) reads out the fuse values and sets the delete-latches via a scan-chain for each fused array set to tell the translator logic not to use the defective array set.

16. The method according to claim 15 wherein for system runs the system at runtime:
  enables a branch target buffer (BTB) which contains a mechanism to detect an array failure, which could have developed over time, and
  deletes an array set such that the processor unit can continue running without encountering further failure encounters from the given set of the BTB array, and
  checks cell by cell, when the ABIST engine checks for the validity of an array, for functional compliance to not only detect which set of the given array is bad, but also which precise entry of the array is bad for the exact bad cell is known as fuses are not only contained for the given set but also the given index for the entry of the bad cell allowing a disable action to take place.

17. A method of providing a service to test processor units for defective translation look aside buffer arrays, configure out defective arrays, and thereafter use processor units with configured out, defective arrays, the method of provide the service comprising:
  testing during bring up the control and configuration using e-fuses to enable a processor having a set of hierarchical translation lookaside buffer arrays (TLBS) which includes a TLB2 array set having a four way, set associative, hierarchical lookside buffer and separate multiple input signature register (MISR) latch busses for each set using e-fuses, to be used after reconfiguration after and even though the processor failed a previous ABIST (Array Built-In Self Test); and
  a) individually analyzing each translation look aside buffer array having failed in the fabrication with said ABIST engine for defects;
  b) blowing a fuse associated with a translation look aside buffer array having a defect to configure out the associated TLB2 array set; and
  c) using a processor unit having a hierarchical lookaside buffer array having a defect which has an associated TLB2 array set which has been configured out even if the processor unit failed in fabrication testing.

18. The method of claim 17 wherein said processor units have array latches to enable the ABIST engine to handle failed array sets from the array and processor units having defective arrays to be used.

19. The method of claim 17 wherein said ABIST engine analyzes each set of four sets of a hierarchical lookaside buffer by:
  a) scanning failing array sets;
  b) activating fuses of failing array sets found in a previous fabrication test; and
  c) in subsequent system runs:
    i) initiating ABIST tests;
    ii) blowing fuses forcing good latch signatures to pass ABIST tests; and
    iii) reading fuse values and setting latches for each fused array to thereby isolate defective arrays.

20. The method according to claim 19, wherein for system runs:
  a) the system starts and runs the ABIST tests; and,
  b) the activated fuses force "good" MISR-signatures in order to pass the ABIST test during IML (Initial Microcode Load); and,
  c) the processor service element (SE) reads out the fuse values and sets the delete-latches via a scan-chain for each fused array set to tell the translator logic not to use the defective array set, and wherein:
  the system at runtime:
  enables a branch target buffer (BTB) which contains a mechanism to detect an array failure, which could have developed over time, and
  deletes an array set such that the processor unit can continue running without encountering further failure encounters from the given set of the BTB array, and
  checks cell by cell, when the ABIST engine checks for the validity of an array, for functional compliance to not only detect which set of the given array is bad, but also which precise entry of the array is bad for the exact bad cell is known as fuses are not only contained for the given set but also the given index for the entry of the bad cell allowing a disable action to take place.

* * * * *